United States Patent
Liu et al.

(10) Patent No.: US 12,316,197 B2
(45) Date of Patent: May 27, 2025

(54) BRAKE RESISTOR DESIGN FOR CONTROLLING ROTOR SPEED DURING GENERATOR SHUTDOWN SEQUENCE

(71) Applicant: Sapphire Technologies, Inc., Cerritos, CA (US)

(72) Inventors: Jeremy Liu, Norwalk, CA (US); Liping Zheng, Buena Park, CA (US); Suratkal P. Shenoy, Mission Viejo, CA (US)

(73) Assignee: Sapphire Technologies, Inc., Cerritos, CA (US)

( * ) Notice: Subject to any disclaimer, the term of this patent is extended or adjusted under 35 U.S.C. 154(b) by 269 days.

(21) Appl. No.: 17/823,842

(22) Filed: Aug. 31, 2022

(65) Prior Publication Data

US 2024/0072607 A1 Feb. 29, 2024

(51) Int. Cl.
| | |
|---|---|
| F01D 21/14 | (2006.01) |
| F01D 15/10 | (2006.01) |
| H02K 7/18 | (2006.01) |
| H02K 11/04 | (2016.01) |
| H02P 3/22 | (2006.01) |

(52) U.S. Cl.
CPC ........... H02K 7/1823 (2013.01); H02K 11/04 (2013.01)

(58) Field of Classification Search
CPC ...... H02K 11/04; H02K 7/1823; F01D 21/00; F01D 21/02; F01D 21/14; F01D 15/10; F05D 2270/021; F05D 2260/903; H02P 2101/20; H02P 3/22
USPC ........................................................ 290/52
See application file for complete search history.

(56) References Cited

U.S. PATENT DOCUMENTS

| | | | |
|---|---|---|---|
| 7,586,216 | B2 | 9/2009 | Li et al. |
| 7,638,892 | B2 | 12/2009 | Myers |
| 8,146,360 | B2 | 4/2012 | Myers et al. |
| 8,384,232 | B2 | 2/2013 | Myers et al. |

(Continued)

FOREIGN PATENT DOCUMENTS

| | | |
|---|---|---|
| EP | 1863162 | 12/2007 |
| EP | 1909371 | 4/2008 |

(Continued)

OTHER PUBLICATIONS

International Search Report and Written Opinion in International Appln. No. PCT/US2023/031560, mailed on Dec. 19, 2023, 14 pages.

*Primary Examiner* — Burton S Mullins
(74) *Attorney, Agent, or Firm* — Fish & Richardson P.C.

(57) ABSTRACT

An electric generator includes a turbine wheel configured to receive process gas and rotate in response to expansion of the process gas flowing into an inlet of the turbine wheel. A rotor is coupled to the turbine wheel and can rotate with the turbine wheel in a stator. The electric generator generates a current upon rotation of the rotor within the stator. A power electronics system is electrically connected to an electrical output of the electric generator and receives alternating current from the electric generator. The electric generator includes a brake resistor assembly having an impedance that matches an impedance of the electric generator. A contactor is electrically connected the electrical output of the electric generator and is configured to connect the electric generator to the brake resistor assembly based on a fault condition.

19 Claims, 7 Drawing Sheets

(56) References Cited

U.S. PATENT DOCUMENTS

| | | | |
|---|---|---|---|
| 8,471,534 B2* | 6/2013 | Panosyan | H02P 9/107 |
| | | | 322/44 |
| 8,692,523 B2* | 4/2014 | Drobnjak | H02J 3/38 |
| | | | 290/44 |
| 8,739,538 B2 | 6/2014 | Myers et al. | |
| 8,839,622 B2 | 9/2014 | Myers et al. | |
| 10,050,433 B2* | 8/2018 | Panosyan | H02P 3/22 |
| 2002/0080633 A1* | 6/2002 | Kang | F02C 7/08 |
| | | | 363/71 |
| 2002/0163819 A1* | 11/2002 | Treece | F02B 43/10 |
| | | | 363/34 |
| 2005/0174081 A1 | 8/2005 | Nguyen et al. | |
| 2012/0013125 A1 | 1/2012 | Myers et al. | |
| 2012/0306201 A1* | 12/2012 | Sorensen | F03B 11/00 |
| | | | 338/53 |
| 2013/0286591 A1 | 10/2013 | Myers et al. | |
| 2019/0288624 A1* | 9/2019 | Gupta | H02P 3/22 |

FOREIGN PATENT DOCUMENTS

| | | | | |
|---|---|---|---|---|
| EP | 3276165 | | 1/2018 | |
| WO | WO-2007072007 A1 * | | 6/2007 | H02P 9/006 |
| WO | WO 2011/019321 | | 2/2011 | |

* cited by examiner

BRAKE RESISTOR DESIGN FOR CONTROLLING ROTOR SPEED DURING GENERATOR SHUTDOWN SEQUENCE

BACKGROUND

The efficient and effective movement of gases from producing regions to consumption regions uses an extensive and elaborate transportation system. Gases transported via pipelines can be pressurized and can traverse long distances through pipelines at high pressures. For example, natural gas that is transported through pipelines travels at high pressure in the pipeline. Natural gas is one of the principal sources of energy for many of our day-to-day needs and activities. Natural gas is an attractive fossil fuel for its abundance and relative cleanliness. As another example, hydrogen can also be transported at high pressures using pipelines. Hydrogen is a rapidly expanding global energy storage market. Hydrogen is used in many manufacturing processes from petroleum refining to food processing. Hydrogen is also used as a fuel source for gas turbines and in a broad range of fuels cells to generate electricity in industrial and consumer transportation sectors. Other gases can also be transported through pipelines at high pressures, including propane, oxygen, carbon dioxide, and others.

BRIEF DESCRIPTION OF THE DRAWINGS

Like reference symbols in the various drawings indicate like elements. Drawings not to scale.

DETAILED DESCRIPTION

Natural gas, hydrogen, and other process gases are pressurized to facilitate efficient transportation in pipelines that are sometimes many miles long. The pipelines, for example, transport gasses from production sites (e.g., wells) to processing facilities and from processing facilities to local distribution networks, such as regional, city or district networks or on-site industrial plants networks. To deliver the gas safely through local distribution networks and for use, the process gas is depressurized to lower levels (often using pressure regulators). The pressure is stepped down at pressure letdown (PLD) stations for delivery to industrial, commercial, and residential end users. The PLD stations use regulating valves to achieve the required pressure drop, but also waste significant amounts of energy in the process. Additional regulating valves can be used at other locations for pressure control, such as in the pipelines between the production and processing facilities, within the sub-processes of the processing facilities, and within the end user's processes and piping. A turboexpander generator can be installed in parallel to the regulating valve to recover the wasted energy from pressure reduction and produce electrical power. The electrical power can be directed to a power grid or elsewhere. Along the same lines, a turboexpander generator can be installed at a gas storage facility upstream of one or more storage tanks to recover high pressure gasses dispensed from a tanker truck, through the turboexpander generator, to the storage tanks. The turboexpander generator is relevant in other applications, such as in a hydrogen liquefaction process where gaseous hydrogen that has been cooled and pressurized is expanded to a liquid state. The expansion can be performed through a turboexpander generator to recover the wasted energy from the expansion and produce electrical power. As above, the electrical power can be directed to a power grid or elsewhere, such as used to power compressors or other components of the liquefaction process. In each instance, by recovering lost energy from natural gas and hydrogen pressure letdown applications, the turboexpander can generate electricity while also reducing $CO_2$ emissions, increasing overall plant efficiency, offsetting electrical costs, and generating additional revenue.

The power grid that the turboexpander can supply power to (and draw power from) can be a national or regional power grid, a local power grid for a city or district, or a small grid, local grid, or microgrid, such as an on-site grid that supplies power to a building, campus, industrial manufacturing or processing plant, or neighborhood.

Figure 1:
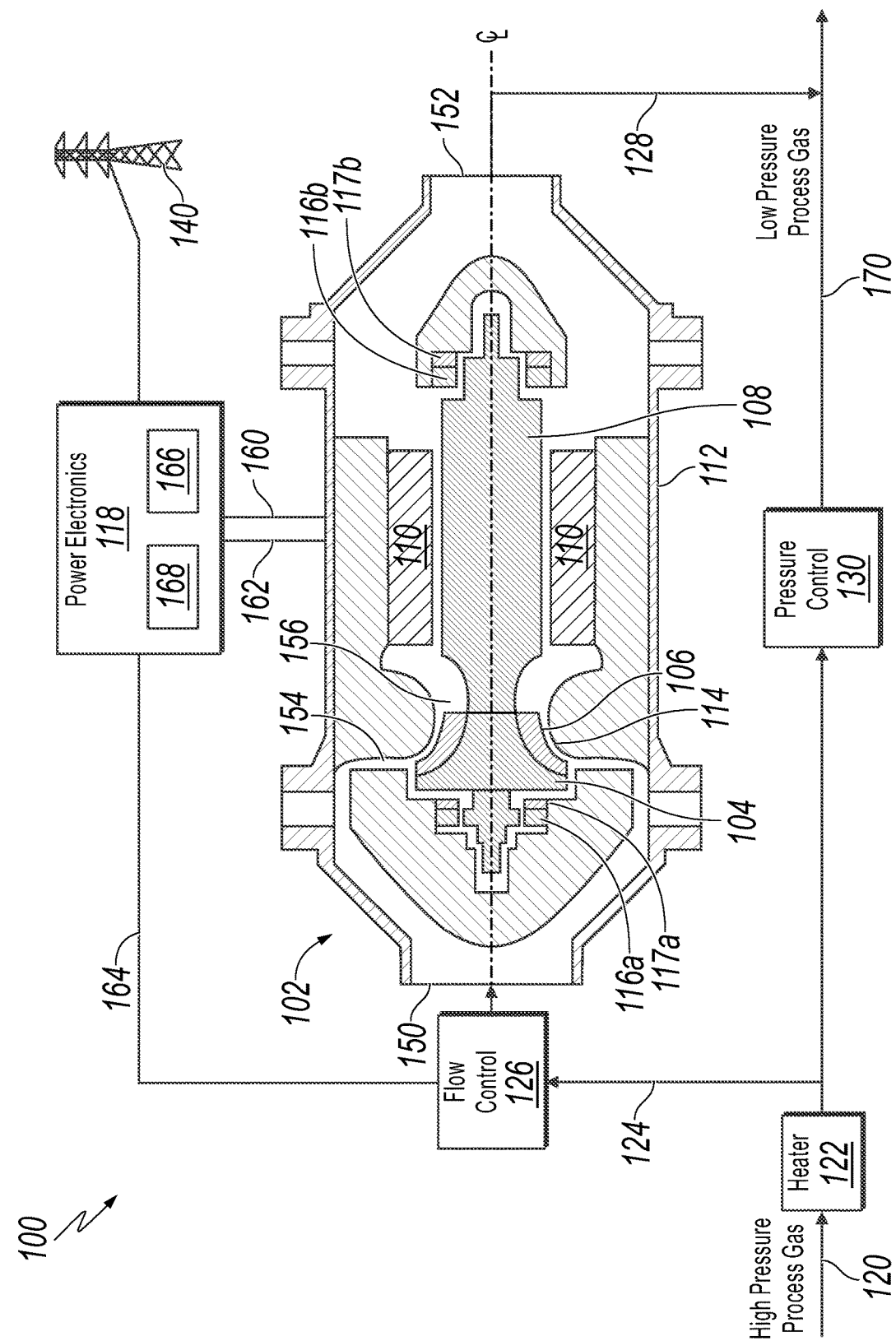
FIG. 1 is a schematic diagram of an electric power generation system coupled to a power grid in accordance with embodiments of the present disclosure.

FIG. 1 is a schematic diagram of an electric power generation system 100 coupled to a power grid 140 in accordance with embodiments of the present disclosure. The electric power generation system 100 can be added at a PLD station to capture energy from gas expansion from the PLD process, or in any of the other applications described above. The electric power generation system 100 includes a turboexpander 102 in parallel with a pressure control valve 130. The turboexpander 102 is arranged axially so that the turboexpander 102 can be mounted in-line with a pipe. The turboexpander 102 acts as an electric generator by generating electrical energy from rotational kinetic energy derived from expansion of a gas through a turbine wheel 104. For example, rotation of the turbine wheel 104 can be used to rotate a rotor 108 within a stator 110, which then generates electrical energy.

FIG. 1 is a schematic diagram of an electric power generation system 100 coupled to a power grid 140 in accordance with embodiments of the present disclosure. The electric power generation system 100 can be added at a PLD station to capture energy from gas expansion from the PLD process. The electric power generation system 100 includes a turboexpander 102 in parallel with a pressure control valve 130. The turboexpander 102 is arranged axially so that the turboexpander 102 can be mounted in-line with a pipe. The turboexpander 102 acts as an electric generator by generating electrical energy from rotational kinetic energy derived from expansion of a gas through a turbine wheel 104. For example, rotation of the turbine wheel 104 can be used to rotate a rotor 108 within a stator 110, which then generates electrical energy.

The turboexpander 102 can include a high-performance, high-speed permanent magnet generator. In certain embodiments, the turboexpander 102 includes an a radial in-flow expansion turbine wheel 104. Turboexpander 102 can also include low loss active magnetic bearings (AMBs) 116a,b. The rotor assembly can include permanent magnet section with the turbine wheel 104 mounted directly to the rotor hub. The rotor 108 can be levitated by the magnetic bearing system creating a frictionless (or near frictionless) interface between dynamic and static components. The AMBs 116a,b facilitate a lossless (or near lossless) rotation of the rotor 108.

The turboexpander 102 is shown to have the process gas flow through the system, which cools the generator section and eliminates the need for auxiliary cooling equipment. In some embodiments, non-flow-through overhung systems can also be implemented. The power electronics 118 for turboexpander combines a Variable Speed Drive (VSD) 166 and Magnetic Bearing Controller (MBC) 168 into one cabinet, in some implementations. The VSD allows for a consistent and clean delivery of generated power from the turboexpander 102 to a power grid 140. The VSD 166 regulates the frequency and amplitude of the generated current to match the local grid. After expansion, the gas exits the turboexpander 102 along the same axial path for downstream processes.

The turboexpander 102 is shown as having a flow-through configuration. The flow-through configuration permits process gas to flow from an inlet side of the turboexpander 102 to an outlet side of the turboexpander 102. The gas flows into a radial gas inlet 154 to a turbine wheel 104 and an axial gas outlet 156 from the turbine wheel 104. The gas then flow through the generator and out of the outlet 156, where the gas rejoins the gas pipeline 170. Generally, high pressure process gas 120 is directed to flow into the turboexpander 102 through a flow control system 126. The flow control system 126 includes a flow or mass control valve and an emergency shut off valve. Flow control system 126 can be controlled electrically from power electronics 118 by control line 164. In embodiments, the turboexpander housing 112 is hermetically sealed. As mentioned above, the turboexpander can be non-flow-through and overhung without deviating from the scope of this disclosure. The high pressure process gas 120 is expanded by flowing through the turbine wheel 104, resulting in a pressure letdown of the process gas. Lower pressure process gas 128 exits the turboexpander to rejoin the pipeline for downstream transit and distribution. The expansion of the high pressure process gas 120 through the turbine wheel 104 causes the turbine wheel 104 to rotate, which causes the rotor 108 to rotate. The rotation of the rotor 108 within the stator 110 generates electrical energy. The turboexpander 102 achieves the desired pressure letdown and captures the energy from the pressure letdown to generate electricity. A pressure control valve 130, such as a conventional pressure regulator, can be installed in parallel to the turboexpander 102. The pressure control valve 130 can be used to control the pressure of the high pressure process gas 120 that flows through the turboexpander. Any excess high pressure process gas that is not directed into the turboexpander can be directed through the pressure control valve 130.

In some embodiments, a heater 122 can heat the high pressure process gas 120 prior to flowing the gas into the turboexpander 102. For example, if the expansion of the gas through the turbine wheel 104 lowers the temperature of the process gas to a point where moisture in the gas freezes at the turbine wheel or other downstream locations in the pipeline, the pressurized process gas 120 can be heated by heater 122. Heated high pressure process gas 124 can then be directed into the turboexpander 102. The heating of the process gas can prevent freezing moisture as the gas expands and its temperature drops.

The turboexpander 102 includes a turbine wheel 104. The turbine wheel 104 is shown as a radial inflow turbine wheel, though other configurations are within the scope of this disclosure, such as axial flow turbine wheels. In this example, heated high pressure process gas 124 is received from an inlet conduit 150 of the housing 112 enters a radially oriented inlet 154 of the turbine wheel 104. In certain embodiments, the fluid flows through an inlet conduit 150 and is diverted by a flow diverter to a radial inlet 154 that directs the flow into the radial inflow of the turbine wheel 104. After expanding, the lower pressure process gas exits the turbine wheel 104 from an axially oriented outlet 156 to outlet conduit 152 of the housing 112.

The turbine wheel 104 can be directly affixed to the rotor 108, or to an intermediate common shaft, for example, by fasteners, rigid drive shaft, welding, or other manner. For example, the turbine wheel 104 may be received at an end of the rotor 108, and held to the rotor 108 with a shaft. The shaft threads into the rotor 108 at one end, and at the other, captures the turbine wheel 104 between the end of rotor 108 and a nut threadingly received on the shaft. The turbine wheel 104 and rotor 108 can be coupled without a gearbox and rotate at the same speed. In other instances, the turbine wheel 104 can be indirectly coupled to the rotor 108, for example, by a gear train, clutch mechanism, or other manner.

The turbine wheel 104 includes a plurality of turbine wheel blades 106 extending outwardly from a hub and that react with the expanding process gas to cause the turbine wheel 104 to rotate. FIG. 1 shows an unshrouded turbine wheel, in which each of the turbine blades 106 has an exposed, generally radially oriented blade tip extending between the radial inlet 154 and axial outlet 156. As discussed in more detail below, the blade tips substantially seal against a shroud 114 on the interior of the housing 112. In certain instances, the turbine wheel 104 is a shrouded turbine wheel.

In configurations with an un-shrouded turbine wheel 104, the housing 112 includes an inwardly oriented shroud 114 that resides closely adjacent to, and at most times during operation, out of contact with the turbine wheel blades 106. The close proximity of the turbine wheel blades 106 and shroud 114 substantially seals against passage of process gas therebetween, as the process gas flows through the turbine wheel 104. Although some amount of the process gas may leak or pass between the turbine wheel blades 106 and the shroud 114, the leakage is insubstantial in the operation of the turbine wheel 104. In certain instances, the leakage can be commensurate with other similar unshrouded-turbine/shroud-surface interfaces, using conventional tolerances between the turbine wheel blades 106 and the shroud 114. The amount of leakage that is considered acceptable leakage may be predetermined. The operational parameters of the turbine generator may be optimized to reduce the leakage. In embodiments, the housing 112 is hermetically sealed to prevent process gases from escaping the radial inlet 154 of the turbine wheel 104.

The shroud 114 may reside at a specified distance away from the turbine wheel blades 106, and is maintained at a distance away from the turbine wheel blades 106 during operation of the turboexpander 102 by using magnetic positioning devices, including active magnetic bearings and position sensors.

Bearings 116a and 116b are arranged to rotatably support the rotor 108 and turbine wheel 104 relative to the stator 110 and the shroud 114. The turbine wheel 104 is supported in a non-cantilevered manner by the bearings 116a and 116b. In embodiments, the turbine wheel 104 may be supported in a cantilevered manner and bearings 116a and 116b may be located on the outlet side of turbine wheel 104. In certain instances, one or more of the bearings 116a or 116b can include ball bearings, needle bearings, magnetic bearings, foil bearings, journal bearings, or others.

Bearings 116a and 116b may be a combination radial and thrust bearing, supporting the rotor 108 in radial and axial directions. Other configurations could be utilized. The bearings 116a and 116b need not be the same types of bearings.

In the embodiments in which the bearings 116a and 116b are magnetic bearings, a magnetic bearing controller (MBC) 168 is used to control the magnetic bearings 116a and 116b. Position sensors 117a, 117b can be used to detect the position or changes in the position of the turbine wheel 104 and/or rotor 108 relative to the housing 112 or other reference point (such as a predetermined value). Position sensors 117a, 117b can detect axial and/or radial displacement. The magnetic bearing 116a and/or 116b can respond to the information from the positions sensors 117a, 117b and adjust for the detected displacement, if necessary. The MBC 168 may receive information from the position sensor(s) 117a, 117b and process that information to provide control signals to the magnetic bearings 116a, 116b. MBC 168 can communicate with the various components of the turboexpander 102 across a communications channel 162.

The use of magnetic bearings 116a, 116b and position sensors 117a, 117b to maintain and/or adjust the position of the turbine wheel blades 106 such that the turbine wheel blades 106 stay in close proximity to the shroud 114 permits the turboexpander 102 to operate at high efficiencies. The use of the active magnetic bearings 116a,b in the turboexpander 102 eliminates physical contact between rotating and stationary components, as well as eliminate lubrication and lubrication systems. In some embodiments, brush seals can be used to prevent gas leakage. The magnetic bearings 116a,b and position sensors 117a,b allow for the rotor to stay in close proximity to the brush seals.

The turboexpander 102 may include one or more backup bearings. For example, at start-up and shut-down or in the event of a power outage that affects the operation of the magnetic bearings 116a and 116b, bearings may be used to rotatably support the turbine wheel 104 during that period of time. The backup bearings and may include ball bearings, needle bearings, journal bearings, or the like. As mentioned previously, the turboexpander 102 is configured to generate electricity in response to the rotation of the rotor 108. In certain instances, the rotor 108 can include one or more permanent magnets. The stator 110 includes a plurality of conductive coils. Electrical current is generated by the rotation of the magnet within the coils of the stator 110. The rotor 108 and stator 110 can be configured as a synchronous, permanent magnet, multiphase alternating current (AC) generator. The bi-directional electrical connection 160 can include a three-phase output, for example. The bi-directional electrical connection 160 can facilitate conveyance of (e.g., 3 phase) power output from the generator and can also supply power to the generator for start-up (e.g., to cause the rotor to begin rotating while process gas or other working fluid pressure builds up and can spin the turbine wheel 104). In certain instances, stator 110 may include a plurality of coils (e.g., three or six coils for a three-phase AC output). When the rotor 108 is rotated, a voltage is induced in the stator coil. At any instant, the magnitude of the voltage induced in coils is proportional to the rate at which the magnetic field encircled by the coil is changing with time (i.e., the rate at which the magnetic field is passing the two sides of the coil). In instances where the rotor 108 is coupled to rotate at the same speed as the turbine wheel 104, the turboexpander 102 is configured to generate electricity at that speed. Such a turboexpander 102 is what is referred to as a "high speed" turbine generator. For example, in embodiments, the turboexpander 102 can produce up to 280 kW at a continuous speed of 30,000 rpm. In embodiments, the turboexpander can produce on the order of 350 kW at higher rotational speeds (e.g., on the order of 35,000 rpm).

In some embodiments, the design of the turbine wheel 104, rotor 108, and/or stator 110 can be based on a desired parameter of the output gas from the turboexpander 102. For example, the design of the rotor and stator can be based on a desired temperature of the gas 128.

The turboexpander 102 can be coupled to a power electronics 118. Power electronics 118 can include a variable speed drive (VSD) 166 (or variable frequency drive) and the magnetic bearing controller (MBC) 168 (discussed above).

The bi-directional electrical connection 160 of the turboexpander 102 is connected to the VSD 166, which can be programmed to specific power requirements. The VSD 166 can include an insulated-gate bipolar transistor (IGBT) rectifier 208 to convert the variable frequency, high voltage output from the turboexpander 102 to a direct current (DC). The rectifier 208 can be a three-phase rectifier for three-phase AC input current. An inverter 210 then converts the DC from the rectifier AC for supplying to the power grid 140. The inverter 210 can convert the DC to 380 VAC-480 VAC at 50 to 60 Hz for delivery to the power grid 140. The specific output of the VSD 166 depends on the power grid and application. Other conversion values are within the scope of this disclosure. The VSD 166 matches its output to the power grid 140 by sampling the grid voltage and frequency, and then changing the output voltage and frequency of the inverter to match the sampled power grid voltage and frequency. In embodiments, rectifier 208 and inverter 210 are bi-directional, so that power from the grid 140 can be supplied to the turboexpander 102. Power from the grid 140 can be used to start rotation of the rotor 108 within the stator 110 during start-up.

The turboexpander 102 is also connected to the MBC 168 in the power electronics 118. The MBC 168 constantly monitors position, current, temperature, and other parameters to ensure that the turboexpander 102 and the active magnetic bearings 116a and 116b are operating as desired. For example, the MBC 168 is coupled to position sensors 117a, 117b to monitor radial and axial position of the turbine wheel 104 and the rotor 108. The MBC 168 can control the magnetic bearings 116a, 116b to selectively change the stiffness and damping characteristics of the magnetic bearings 116a, 116b as a function of spin speed. The MBC 168 can also control synchronous cancellation, including automatic balancing control, adaptive vibration control, adaptive vibration rejection, and unbalance force rejection control.

The turboexpander 102 described above includes example features that are implementation-specific. Certain features may be changed, added, removed, or redesigned without deviating from the scope of this disclosure. For example, other types of bearings can be used instead of or in addition to AMBs, such as ball bearings, fluid film bearings, etc. Different designs of rotors and stators can be used, such as brushless DC, induction-type, etc. Other types of stator cooling architectures can be used, such as non-flow—through and overhung architectures.

Figure 2:
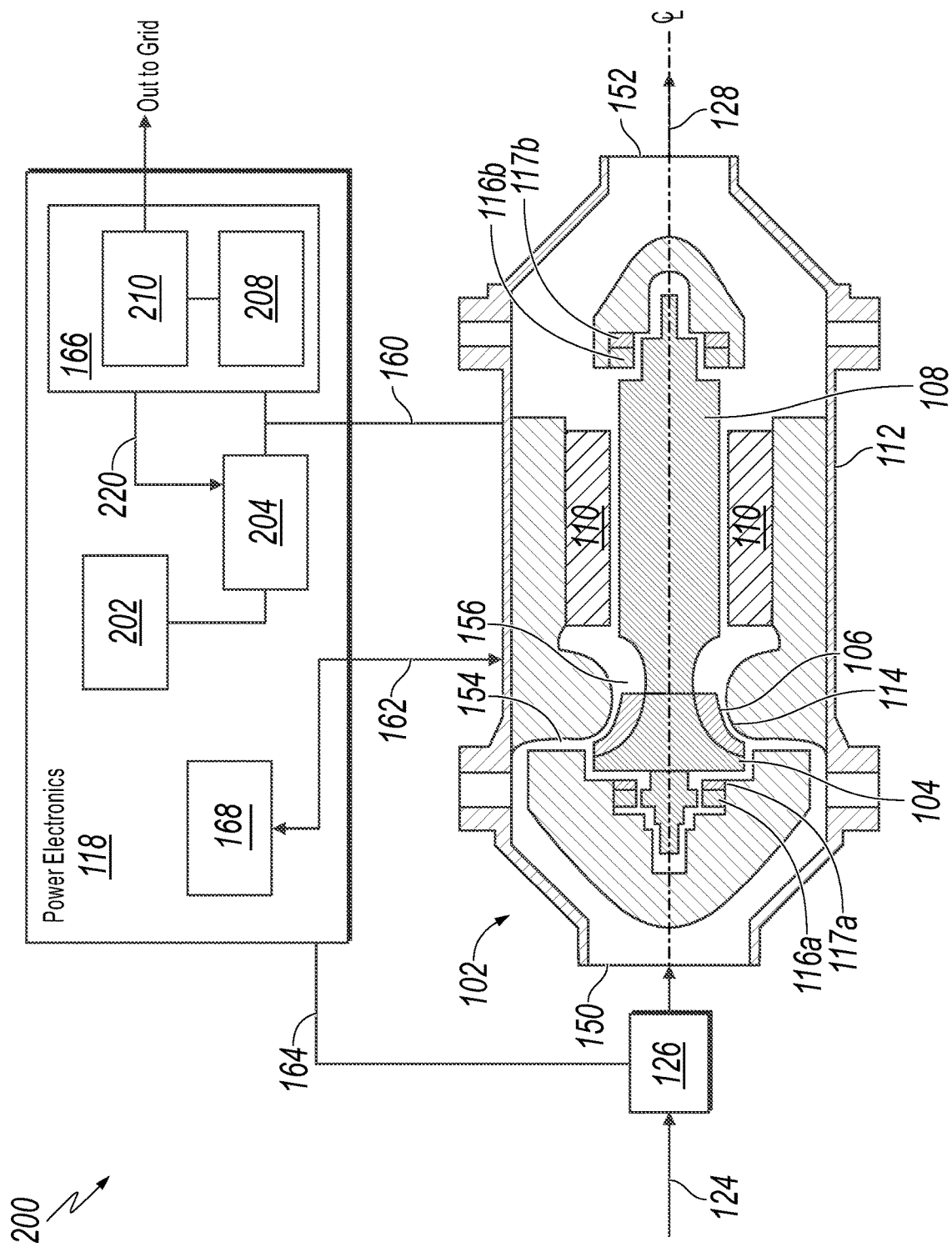
FIG. 2 is a schematic diagram of an example turboexpander system that includes a brake resistor assembly in accordance with embodiments of the present disclosure.

FIG. 2 is a schematic diagram of an example turboexpander system 200 that includes a brake resistor assembly 202 in accordance with embodiments of the present disclosure. Turboexpander system 200 includes a turboexpander 102 and a power electronics 118. The turboexpander 102 receives a heated high pressure process gas 124, which causes a turbine wheel 104 to rotate. The rotation of the turbine wheel 104 rotates a rotor 108 that supports a plurality of permanent magnets. The rotation of the permanent magnets on the rotor 108 induces a current through coils or windings on stator 110.

The electric generator system acts as a brake on the rotor 108. This braking torque converts the shaft power, created by the process gas flow, to electrical power that can be put on an electrical grid, for example. In the case of a grid failure, inverter failure, or other fault condition, braking torque is lost and the rotor 108 may spin up towards an undesirable overspeed. To prevent overspeed, the power can be diverted to a brake resistor assembly 202 that can temporarily absorb the rotor power until the process gas flow is reduced or removed (e.g., by flow control system 126) or until the fault condition is resolved. Flow control system 126 can include a one or a combination of a flow control valve or a mass control valve or an emergency shutoff valve. Flow control system 126 can be controlled by power electronics 118 or other electrical, mechanical, or electromagnetic signal. For example, a fault condition can signal the flow control system 126 to close or partially close, thereby removing or restricting gas supply to the turboexpander 102. Restricting or removing gas flow to the turboexpander slows the rotation of the turbine wheel and consequently, slows the rotor. In the example shown in FIGS. 1 and 2, a signal channel 164 from the power electronics 118 can be used to open and/or close the flow control system 126.

Flow control system 126 can control the pressure of the flow of the high-pressure process gas that enters the turboexpander 102. The flow rate of the high-pressure process gas can be controlled by the flow control system 126 based on the size of the turbine wheel 104 and the desired power output of power electronics 118; the rotational speed of the rotor 108 can be determined based on the desired rotordynamic performance of the rotor 108. The flow control system 126 can be controlled manually or electronically. The flow control system 126, for example, can be controlled electronically based on information about the power output in power electronics 118. If the power output is too low, flow control system 126 can be adjusted to increase flow rate of high-pressure process gas input to the turboexpander 102 to increase the torque of rotor 108; conversely, if power output is too high, flow control system 126 can be adjusted to decrease flow rate of high-pressure process gas input to the turboexpander 102 to decrease the torque of rotor 108.

A fault condition can include a grid failure, VSD failure, inverter failure, or other fault condition. A fault condition can include any condition that removes or reduces the braking torque on the rotor 108.

A brake resistor assembly 202 is electrically connected to the bi-directional electrical connection 160 of the turboexpander 102 (e.g., the output of the generator). The brake resistor assembly 202 can have a tuned impedance to allow an efficient transfer of power from the turboexpander 102 to the brake resistor assembly 202. The brake resistor assembly design is discussed further in the text accompanying FIGS. 3A, 3B, 3C, 4A, & 4B.

In embodiments, a contactor 204 can connect the output current of the turboexpander 102 to the brake resistor assembly 202 when there is a fault condition at the VSD 166 or the power grid 140. The contactor 204 is an electrically controlled switch for switching in an electrical power circuit. The contactor 204 can accommodate the three-phase current output from the generator to direct the current to the brake resistor assembly 202. In embodiments, the contactor can be controlled using a master controller that can detect the fault condition and provide the necessary signaling to the contactor to open or close the circuit between the brake resistor assembly 202 and the turboexpander 102. For example, the fault condition can be detected by the master controller by changes in electrical activity, tripped breakers, or other indications. The master controller can then cause the contactor to open or close to connect the brake resistor assembly 202 and the turboexpander 102.

In some embodiments, the contactor 204 is connected directly to the (three-phase) bi-directional electrical connection 160 of the turboexpander 102. In some embodiments, the brake resistor assembly 202 and/or the contactor 204 are not part of the power electronics, but are connected to the electrical output 160 of the turboexpander 102 outside of the power electronics 118.

The VSD 166 can provide an energizing signal 220 to the coil of the contactor 204 to cause the contactor 204 to connect the bi-directional electrical connection 160 of the turboexpander to the brake resistor assembly 202. Depending on the implementation choice, the contactor 204 can be a normally closed (NC) contactor or a normally open (NO) contactor.

For example, in an example implementation using a NO contactor, during normal operating conditions, the bi-directional electrical connection 160 of the turboexpander 102 is connected to the VSD 166 and supplies three-phase AC current to the VSD 166. In a fault condition, the VSD can energize the contactor to connect the contactor to the bi-directional electrical connection 160 of the turboexpander 102. In some implementations, the energizing signal 220 to the contactor can be provided by another source that can respond to a fault condition (e.g., another component of the power electronics 118 or another component outside the power electronics 118). In this implementation, if failure of the VSD 166 is the cause of the fault condition, the contactor can operate independent of the VSD 166.

If an NC contactor is used, then the VSD 166 (or other source) provides an energizing signal 220 to the contactor 204 to keep the contactor switches open during normal operating conditions. A fault condition can result in the removal of the energizing signal 220 to the contactor, which results in the contactor switches closing and completing the circuit between the bi-directional electrical connection 160 of the turboexpander 102 and the brake resistor assembly 202.

In some embodiments, the brake resistor 202 can be disconnected from the bi-directional electrical connection 160 of the turboexpander 102 when operational states return to normal.

Figure 3A:
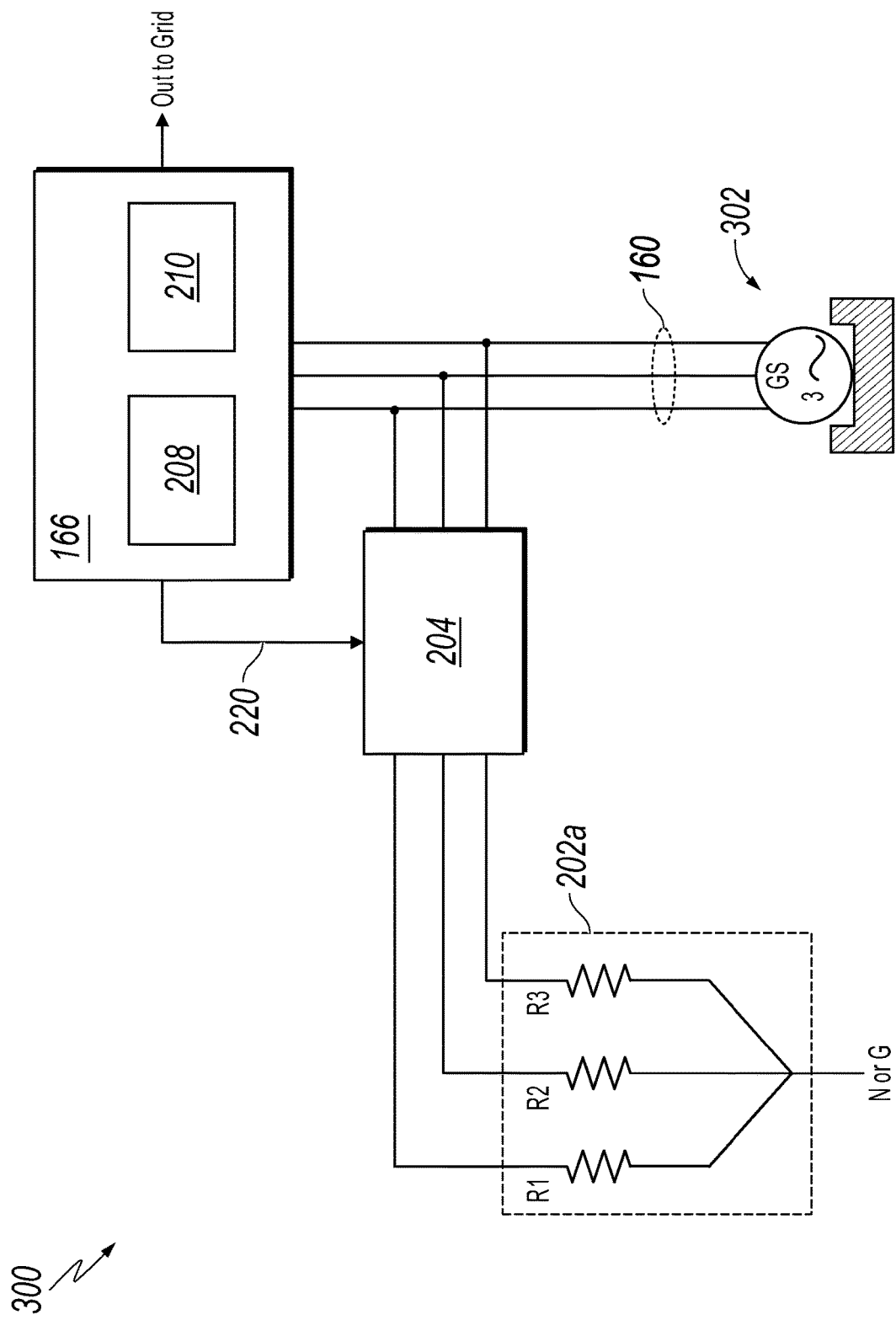
FIG. 3A is a schematic diagram of an example power circuit that includes an electrical output of the turboexpander selectively coupled to a power grid or to a brake resistor assembly in accordance with embodiments of the present disclosure.
Figure 3B:
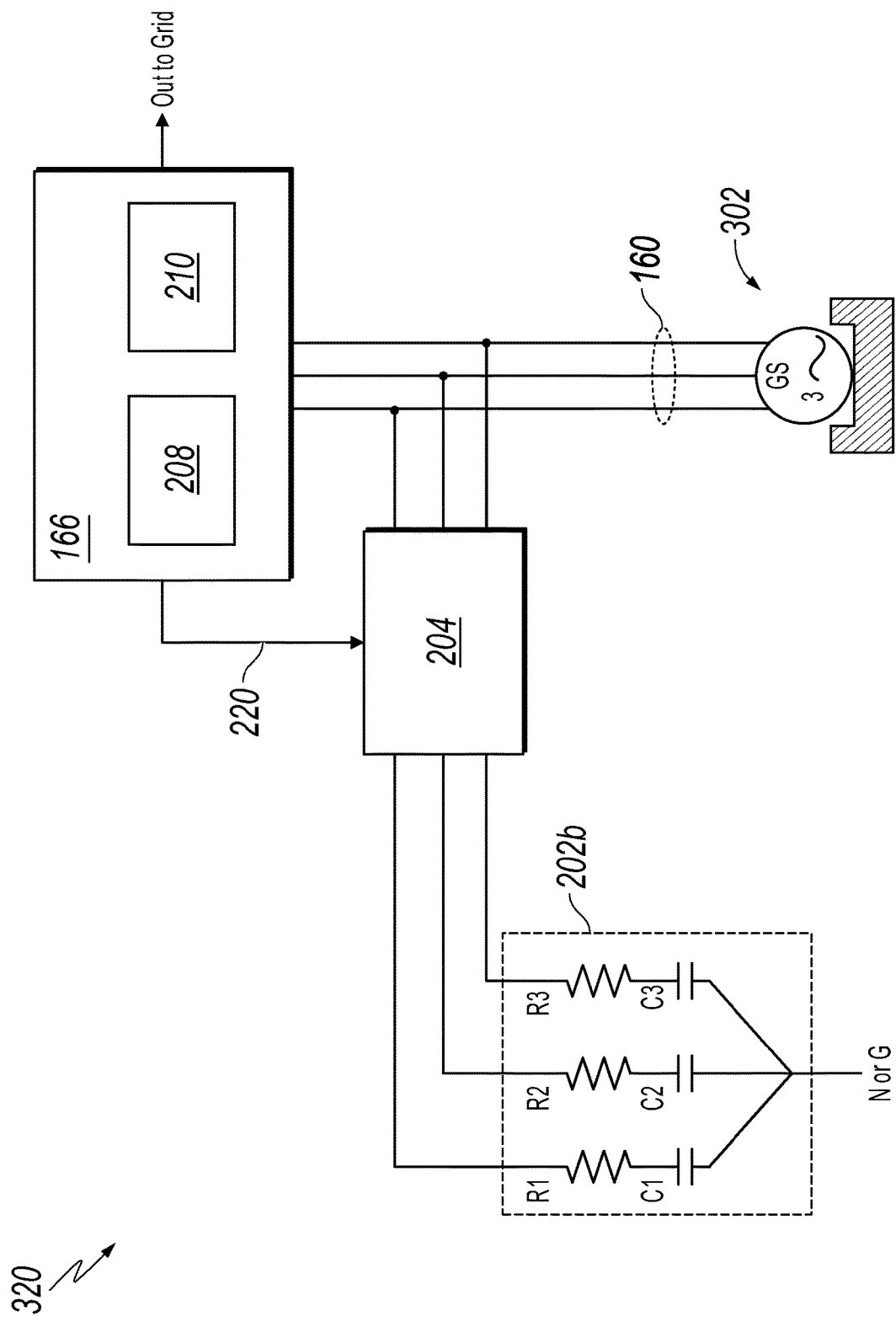
FIG. 3B is a schematic diagram of another example power circuit that includes an electrical output of the turboexpander selectively coupled to a power grid or to a brake resistor assembly in accordance with embodiments of the present disclosure.
Figure 3C:
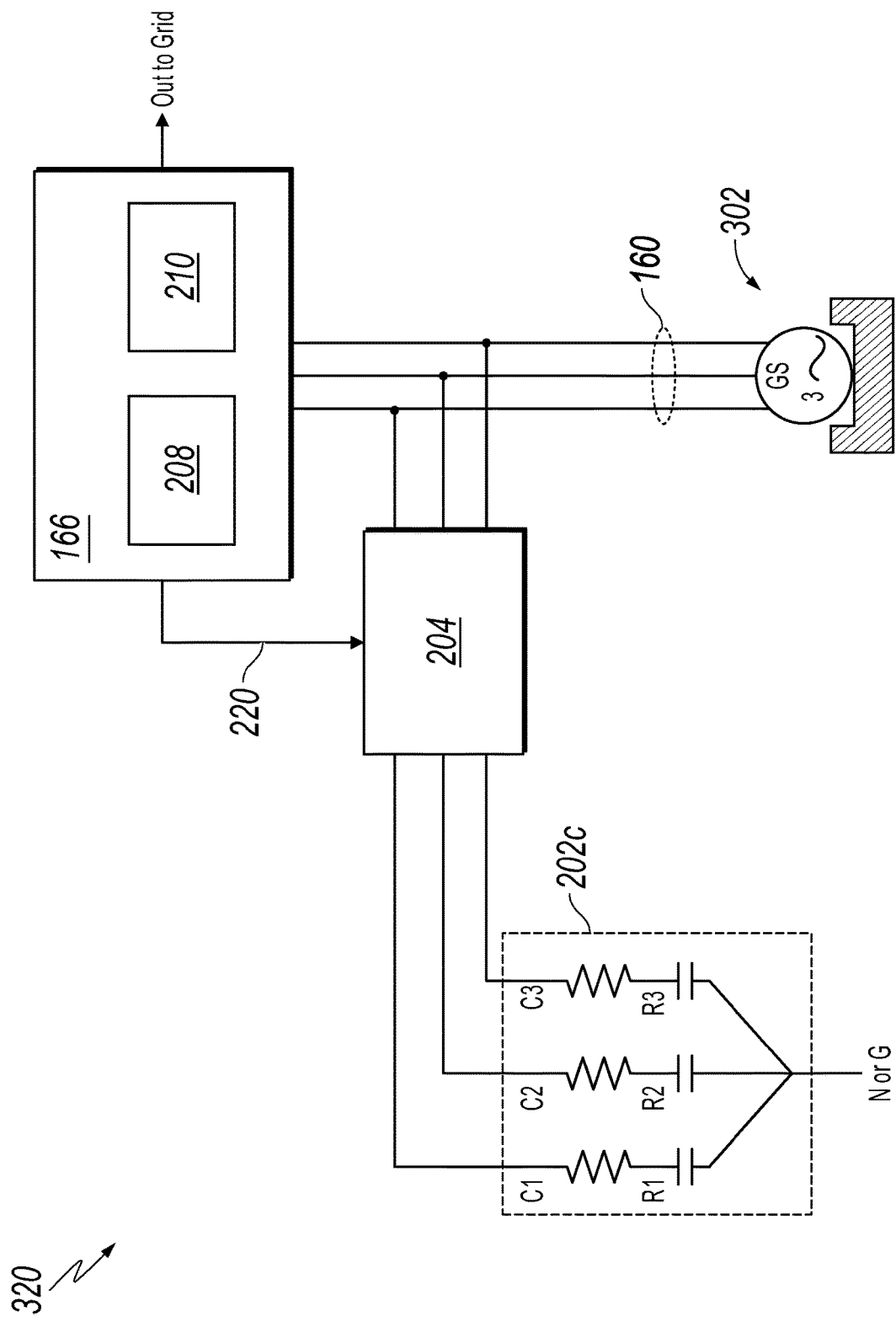
FIG. 3C is a schematic diagram of another example power circuit that includes an electrical output of an electric generator selectively coupled to a variable speed drive or to a brake resistor assembly in accordance with embodiments of the present disclosure.

FIG. 3A is a schematic diagram of an example power circuit 300 that includes a bi-directional electrical connection 160 of an electric generator 302 selectively coupled to a variable speed drive 206 or to a brake resistor assembly 202a in accordance with embodiments of the present disclosure. FIG. 3B is a schematic diagram of another example power circuit 320 that includes a bi-directional electrical connection 160 of an electric generator 302 selectively coupled to a variable speed drive 206 or to a brake resistor assembly 202b in accordance with embodiments of the present disclosure. FIG. 3C is a schematic diagram of another example power circuit 340 that includes a bi-directional electrical connection 160 of an electric generator 302 selectively coupled to a variable speed drive 206 or to a brake resistor assembly 202c in accordance with embodiments of the present disclosure. These figures can be described together. In FIGS. 3A-3B and 3C the turboexpander 102 is simplified to be a three-phase permanent magnet synchronous alternating current generator 302. Though not shown, a current monitor can be coupled in parallel to the brake resistor assembly to monitor current flowing into the brake resistor(s).

The brake resistor assembly (either 202a, 202b, or 202c) is designed for a three-phase AC generator 302. In FIG. 3A, the brake resistor assembly 202a includes a resistor in series with each phase of the generator 302. R1 for a first phase, R2 for a second phase, and R3 for the third phase. All three resistors (R1, R2, R3) or resistor assemblies are tied together to a neutral in a Wye configuration. Other configurations are within the scope of this disclosure, such as a delta configuration.

Capacitors can be added to the brake resistor assembly to compensate for generator and cable inductance. Capacitors C1, C2, C3 that are put in series with each phase can be placed on either the neutral side (FIG. 3B) or non-neutral side (FIG. 3C) of the resistors. In brake resistor assembly 202b of FIG. 3B, the capacitors C1, C2, C3 are on the neutral side of the resistors R1, R2, R3, respectively. In brake resistor assembly 202c of FIG. 3C, the capacitors C1, C2, C3 are on the non-neutral side of the resistors R1, R2, R3, respectively. The capacitor value can be tuned according to the operating speed and frequency of the generator and the corresponding impedance from the system inductance. The calculation of the various brake resistor assembly parameters is discussed in more detail in FIGS. 4A-4B.

Figure 4A:
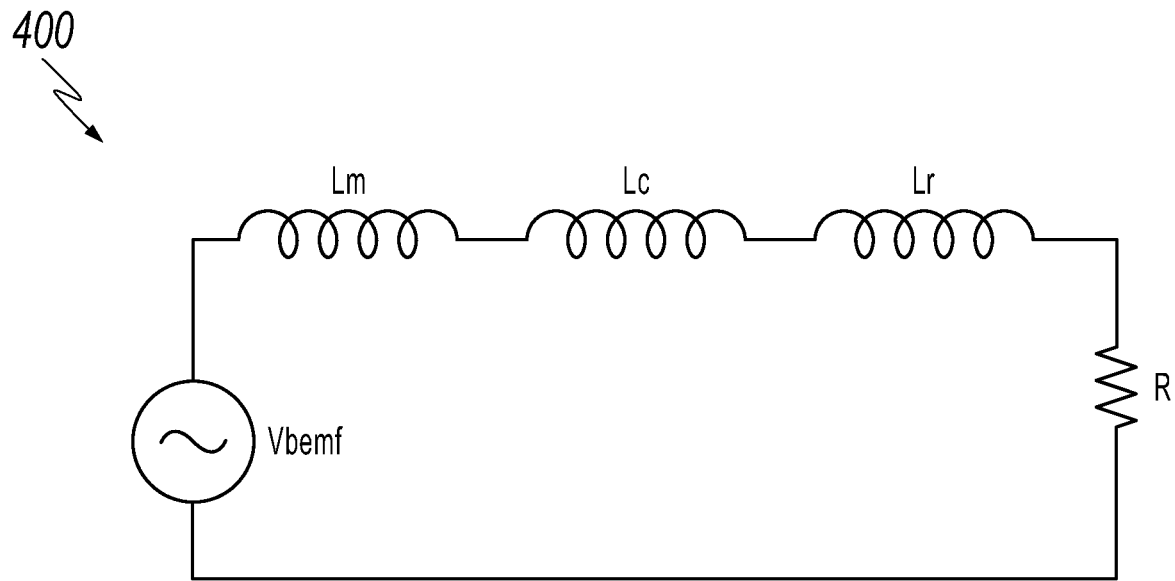
FIG. 4A is a schematic diagram of an example single-phase brake resistor load circuit in accordance with embodiments of the present disclosure.

FIG. 4A is a schematic diagram of an example single-phase brake resistor load circuit 400 in accordance with embodiments of the present disclosure. FIG. 4A shows the simplified schematic of brake resistor load circuit for one phase, where Vbemf is the line-neutral back electromotive force (EMF), Lm is the motor inductance per phase, Lc is the cable inductance, and Lr is the inductance of brake resistor, and R is the brake resistor.

The total inductance is L=Lm+Lc+Lr. The total impedance is $Z=Z_L+R$, where $Z_L$ is the impedance of inductance, which is equal to jωL=jω(Lm+Lc+Lr), where ω is the electrical angular frequency.

The phase current can be expressed as:

$$I = \text{abs}\left(\frac{Vbemf}{Z}\right) = \text{abs}\left(\frac{Vbemf}{ZL+R}\right) = \text{abs}\left(\frac{Vbemf}{j\omega(Lm+Lc+Lr)+R}\right) = \frac{Vbemf}{\sqrt{(\omega(Lm+Lc+Lr))^2+R^2}}$$

The brake resistor power for three-phase system is:

$$P = 3*I^2R = 3*\frac{Vbemf^2*R}{(\omega(Lm+Lc+Lr))^2+R^2}$$

$$L = Lm+Lc+Lr$$

$$ZL = w(Lm+Lc+Lr).$$

When the generator electrical frequency is low, the impedance of inductance is lower compared to the that of the resistor load (abs(ZL)<<R) so can be ignored. Therefore, the brake resistor load power can be expressed as:

$$P = 3*I^2R = 3*\frac{Vbemf^2}{R}$$

When the generator electrical frequency is high, the impedance of inductance can no longer be ignored so the phase current and brake resistor load current/power will drop significantly. To overcome this issue, a capacitor C can be added in series to compensate the impedance of the inductance, which is shown in FIG. 4B.

Figure 4B:
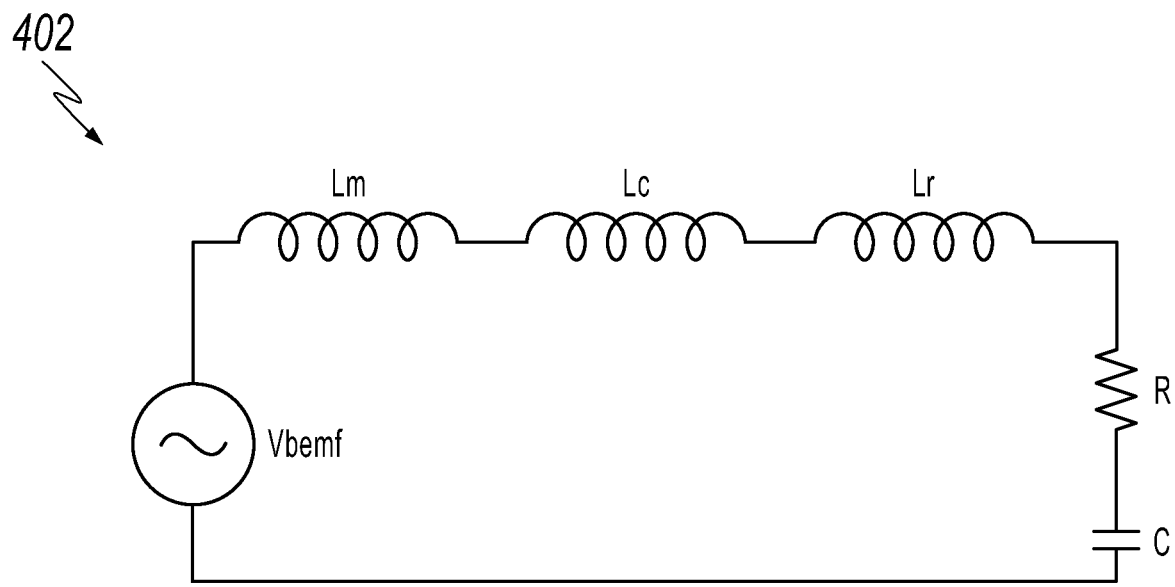
FIG. 4B is a schematic diagram of another example single-phase brake resistor load circuit in accordance with embodiments of the present disclosure.

FIG. 4B is a schematic diagram of another example single-phase brake resistor load circuit 402 in accordance with embodiments of the present disclosure. As shown, a capacitor C is added in series on the neutral side of resistor R. The impedance of the capacitor C is expressed as $$Zc = \frac{1}{j\omega C} = -j\frac{1}{\omega C}.$$

Therefore, the total impedance of the line can be expressed as:

$$Z = ZL + Zc + R = j\omega L - j\frac{1}{\omega C} + R == j\left(\omega L - \frac{1}{\omega C}\right) + R$$

By selecting capacitor (C) value to minimize (or reduce close to zero) abs $$\left(\omega L - \frac{1}{\omega C}\right),$$

the brake resistor power can be increased significantly at higher generator operating frequency up to a value expressed as:

$$P = 3*I^2R = 3*\frac{Vbemf^2}{R}$$

Figure 5:
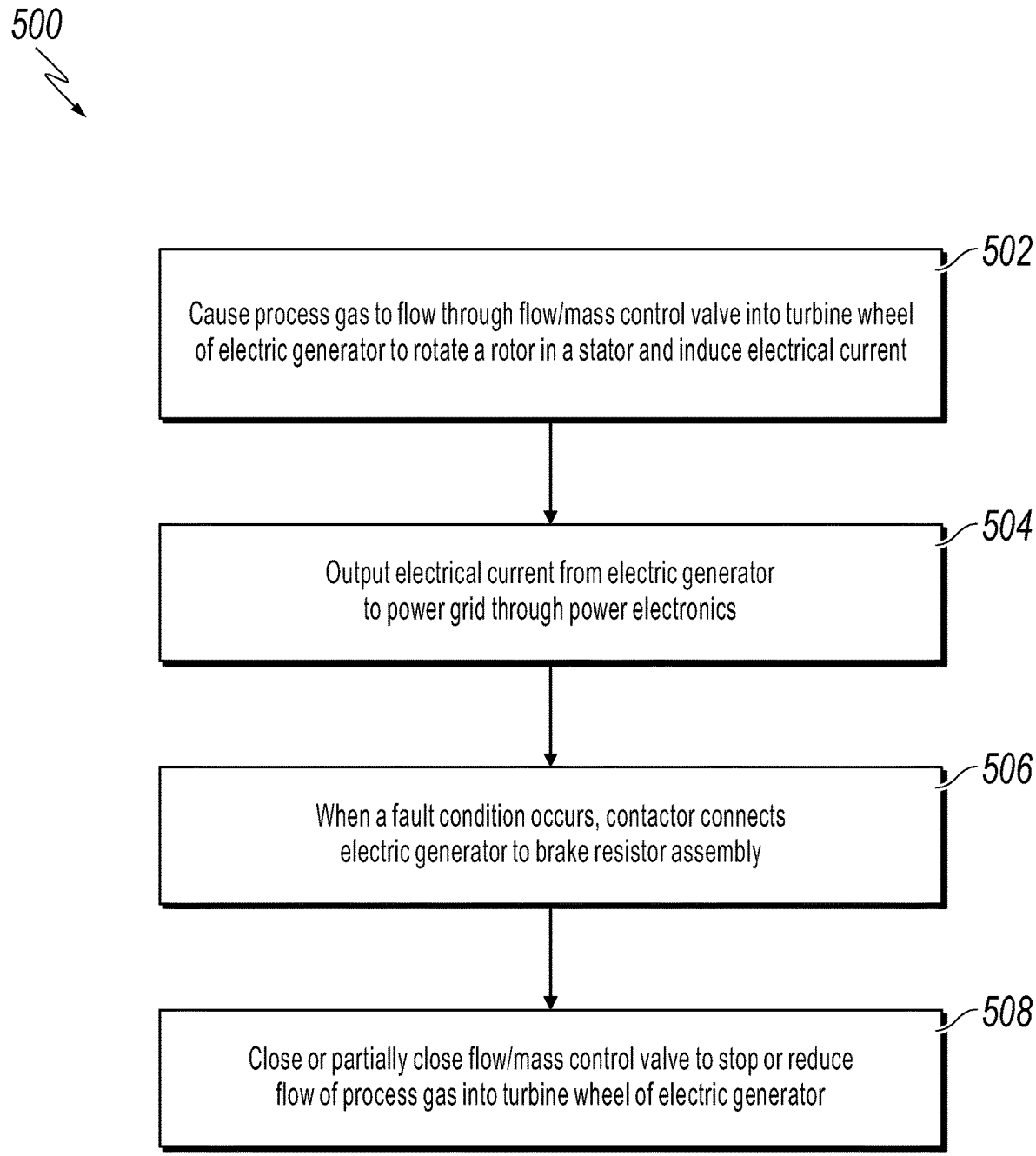
FIG. 5 is a process flow diagram for controlling a rotational speed of a rotor during a shutdown sequence in accordance with embodiments of the present disclosure.

FIG. 5 is a process flow diagram for controlling a rotational speed of a rotor during a pressure letdowns sequence in accordance with embodiments of the present disclosure. During a fault condition, the heated high pressure gas supplied to the turboexpander should be turned off to prevent the turboexpander from continuing to operate. A shutdown sequence can be followed during a fault condition to prevent damaging the turboexpander components, including the rotor, as well as protecting electronic equipment. For example, during a fault condition where the braking torque to the rotor is lost, the rotor can experience overspeed from the process gas rotating the turbine wheel. To prevent rotor overspeed during a fault condition, a contactor can connect the turboexpander to a brake resistor assembly. The brake resistor assembly will prevent the rotor of the turboexpander from overspeed by acting as a load on the turboexpander and providing braking torque to the rotor. Controlling the speed of the rotor using a brake resistor assembly allows for the time it takes to close the flow control valve (or mass control valve or emergency shut-off valve) on the inlet side of the turboexpander.

At the outset, under normal operating conditions, at a pressure letdown station for example, a flow control valve residing at an inlet side of a turboexpander is open to allow heated high pressure process gas to flow into the turboexpander. The heated high pressure process gas enters an inlet of a turbine wheel, which causes the turbine wheel to spin and the heated high pressure process gas to expand and exit the turbine wheel outlet. Rotation of the turbine wheel rotates a rotor. The rotor can include a plurality of permanent magnets. Rotation of the rotor within a stator induces a current to flow in stator coils. In some embodiments, the output of the turboexpander is a three-phase alternating current. The expanded process gas is directed to a turboexpander outlet where it can continue on to other points in the pressure letdown station. (502)

The three-phase alternating current is directed to a power electronics. The power electronics can include a variable speed drive (VSD). The VSD can include a rectifier circuit to convert the three-phase alternating current into a direct current. The direct current can be directed to an inverter circuit that converts the direct current into an alternating current with an amplitude and frequency suitable for supplying the alternating current to a power grid. The VSD can supply the alternating current to the power grid. (504)

When a fault condition occurs, power from the generator will be directed to a brake resistor assembly by a contactor circuit. The brake resistor assembly is sized to limit the acceleration of the rotor. A contactor can connect the brake resistor assembly directly to the output of the generator. The contactor can be a normally open or normally closed contactor. An energizing signal sent to (or removed from) the contactor can cause the contactor to connect the (three-phase) electrical output of the turboexpander to the brake resistor assembly. (506)

The fault condition can also trigger the closure or partial closure of the flow control system (e.g., flow control valve or mass control valve or emergency shutoff valve) to stop or reduce gas flow into the turboexpander. It is expected that the flow control system will act slower than the contactor to prevent the rotor from overspeed, so the brake resistor can act faster to prevent overspeed and potential damage to various components of the turboexpander and/or the power electronics. (508)

The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment. In the foregoing specification, a detailed description has been given with reference to specific exemplary embodiments. It will, however, be evident that various modifications and changes may be made thereto without departing from the broader spirit and scope of the disclosure as set forth in the claims.

What is claimed is:

1. An apparatus comprising:
   an electric generator comprising:
     a turbine wheel configured to receive process gas and rotate in response to expansion of the process gas flowing into an inlet of the turbine wheel and out of an outlet of the turbine wheel,
     a rotor coupled to the turbine wheel and configured to rotate with the turbine wheel, and
     a stationary stator, the electric generator to generate an alternating current upon rotation of the rotor within the stationary stator;
   a power electronics system electrically connected to an electrical output of the electric generator and to receive alternating current from the electric generator;
   a brake resistor assembly comprising an impedance that matches an impedance of the electric generator; and
   a contactor electrically connected the electrical output of the electric generator and configured to connect the electric generator to the brake resistor assembly based on a fault condition.

2. The apparatus of claim 1, wherein the contactor connects the brake resistor assembly to the electric generator in response to a presence or absence of an energizing signal.

3. The apparatus of claim 2, wherein the presence or absence of an energizing signal indicates the fault condition.

4. The apparatus of claim 1, wherein the electric generator comprises a three-phase electrical output, and wherein the brake resistor assembly comprises a brake resistor in series with each phase of the electrical output.

5. The apparatus of claim 4, wherein each brake resistor of the brake resistor assembly is coupled to a neutral or ground plane in a Wye configuration.

6. The apparatus of claim 4, wherein each brake resistor comprises a resistance based on matching the impedance of the brake resistor assembly to the impedance of the electric generator.

7. The apparatus of claim 6, wherein the brake resistor assembly comprises a capacitor in series with each brake resistor.

8. The apparatus of claim 7, wherein each capacitor comprises a capacitance based on matching the impedance of the brake resistor assembly to the impedance of the electric generator.

9. The apparatus of claim 7, wherein the capacitor resides between the brake resistor and a neutral or ground plane.

10. The apparatus of claim 1, wherein the power electronics system comprises a variable speed drive connected to the electrical output of the electric generator, the variable speed drive to convert the alternating current received from the electric generator into an alternating current compatible with a power grid.

11. The apparatus of claim 10, wherein the variable speed drive comprises:
    a rectifier to receive alternating current from the electric generator and convert the alternating current into direct current; and
    an inverter to receive direct current from the rectifier and convert the direct current into an alternating current comprising an amplitude and frequency compatible with the power grid.

12. The apparatus of claim 1, wherein the electric generator comprises a three-phase permanent magnet synchronous generator.

13. A method comprising:
causing gas to flow through a turbine wheel of an electric generator residing downstream of a flow control valve;
generating electrical current by the electric generator;
directing electrical current generated by the electric generator to a power electronics;
activating a contactor residing between the electric generator and the power electronics based on a presence of a fault condition;
directing electrical current generated by the electric generator to a brake resistor assembly through the contactor; and
closing a flow control valve to restrict gas flow to the turbine wheel;
wherein the power electronics comprises an inverter, and
wherein the fault condition comprises a fault condition associated with the inverter.

14. The method of claim 13, comprising directing electrical current generated by the electric generator to a power grid through the power electronics; and
fault condition comprising a power grid fault condition or power grid failure.

15. The method of claim 13, comprising:
directing an energizing signal to the contactor; and
causing one or more switches of the contactor to close based on the energizing signal.

16. The method of claim 13, comprising applying a braking torque to the electric generator using the brake resistor assembly.

17. A system comprising:
a flow control valve to control a flow of a process gas;
an electric generator comprising:
  a process gas inlet on a downstream side of the flow control valve to receive process gas into the electric generator;
  a turbine wheel configured to receive process gas and rotate in response to expansion of the process gas flowing into an inlet of the turbine wheel and out of an outlet of the turbine wheel,
  a rotor coupled to the turbine wheel and configured to rotate with the turbine wheel,
  a stationary stator, the electric generator to generate an alternating current upon rotation of the rotor within the stationary stator, and
  a process gas outlet to direct the process gas into a pressure letdown station;
a power electronics system electrically connected to an electrical output of the electric generator and to receive alternating current from the electric generator, the power electronics system to connect the alternating current from the electric generator to a power grid;
a brake resistor assembly comprising an impedance that matches an impedance of the electric generator; and
a contactor electrically connected the electrical output of the electric generator and configured to connect the electric generator to the brake resistor assembly based on a fault condition.

18. The system of claim 17, wherein the electric generator comprises a three-phase electrical output, and
wherein the brake resistor assembly comprises:
  a brake resistor in series with each phase of the electrical output, each brake resistor of the brake resistor assembly is coupled to a neutral or ground plane in a Wye configuration, and
  wherein each brake resistor comprises a resistance based on matching an impedance of the brake resistor assembly to the impedance of the electric generator.

19. The system of claim 17, wherein:
the brake resistor assembly comprises a capacitor in series with each brake resistor, each capacitor comprising a capacitance based on matching the impedance of the brake resistor assembly to the impedance of the electric generator.

* * * * *